Jan. 7, 1958 R. E. STEELE ET AL 2,818,628
METHOD AND APPARATUS FOR FORMING HOLES IN CERAMIC WARE
Filed June 17, 1954 3 Sheets-Sheet 1
Fig. 1.
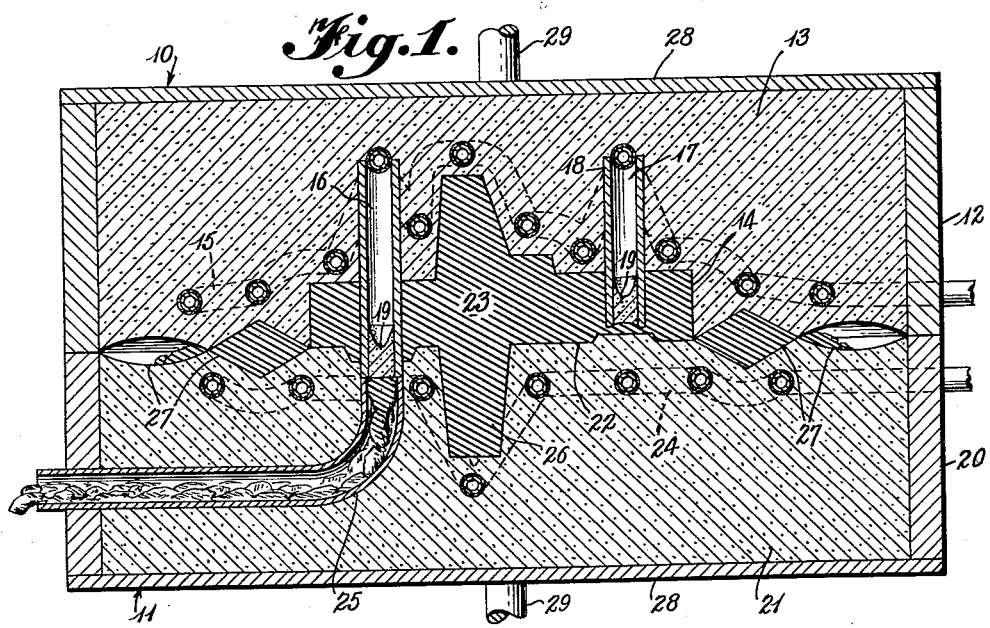
Fig. 3.
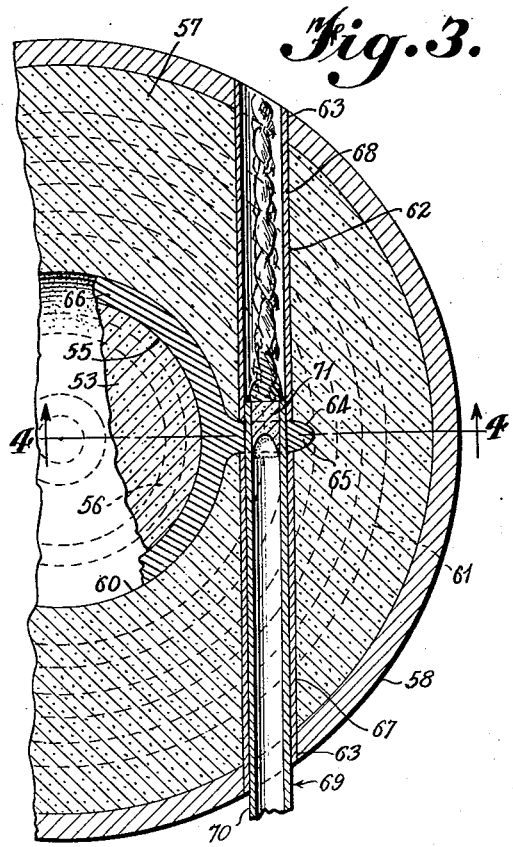
Fig. 4.
INVENTORS
RICHARD E. STEELE AND
ANDREW R. BLACKBURN
BY Burns, Doane, Benedict & Irons
ATTORNEYS

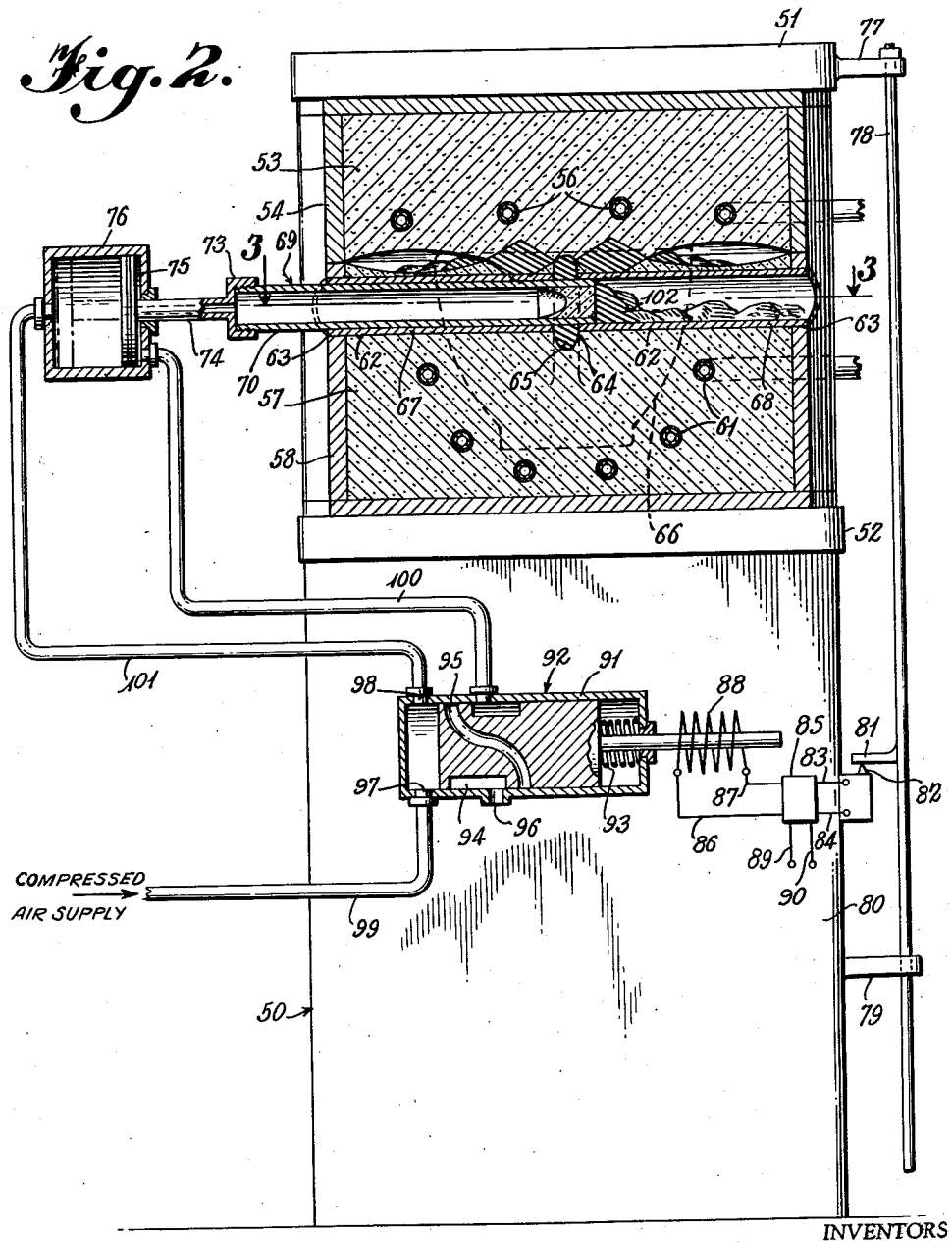

Jan. 7, 1958 R. E. STEELE ET AL 2,818,628
METHOD AND APPARATUS FOR FORMING HOLES IN CERAMIC WARE
Filed June 17, 1954 3 Sheets-Sheet 3

INVENTORS
RICHARD E. STEELE AND
ANDREW R. BLACKBURN
BY
ATTORNEYS

United States Patent Office 2,818,628
Patented Jan. 7, 1958

2,818,628

METHOD AND APPARATUS FOR FORMING HOLES IN CERAMIC WARE

Richard E. Steele, Worthington, and Andrew R. Blackburn, Westerville, Ohio

Application June 17, 1954, Serial No. 437,519

16 Claims. (Cl. 25—129)

This invention relates to apparatus and methods for forming plastic material into shaped ware having a hole or holes in the design thereof. More particularly, the invention embraces apparatus and methods for forming holes in green ceramic ware.

The functional design of many ceramic shapes includes holes. Typical of such ceramic shapes are the various porcelain electrical fittings and mountings, cup handles, industrial porcelains, special artware and dinnerware, baby plates, and the like.

It is conventional in the art to provide holes in shaped ceramic ware in an operation separate from the ware-forming procedure. Cup handles, for example, are normally fashioned independently and affixed as a separate appendage to the green cup body. In some instances, holes are drilled in shaped ware after firing. Attempts to form holes directly in unsupported shaped green ceramic ware are generally unsatisfactory in consequence of the distortion of the ware which inherently occurs in the hole forming process. Holes can be formed in a few types of ceramic ware by dry pressing or semi-plastic pressing on steel dies. These dry and semi-plastic pressing processes are unsuitable for the production of the majority of types of ceramic ware which must be provided with holes.

Our prior U. S. Letters Patent, including particularly Nos. 2,584,109 and 2,584,110, disclose and claim apparatus and methods suitable for the fabrication of various types of ceramic ware including those which cannot be feasibly manufactured by dry pressing or semi-plastic pressing. The apparatus disclosed in the aforementioned patents embraces a mold including a pair of cooperable, permeable, preferably plaster, die members. The die members have opposed contoured surfaces defining a ware-shaping cavity when the mold is closed, and are provided with means for applying fluid pressure through the contoured surfaces thereof. Shaped ware is formed in such mold by opening the die members, placing a moist plastic charge on one of the die members, closing the die members to form the ware in the ware-shaping cavity of the mold and squeeze water from the plastic charge into the permeable contoured surfaces of the die members. The shaped ware is thereafter separated from the die members by applying a fluid under pressure, such as compressed air, through the conduit and contoured surface of one of the die members to release the formed ware therefrom, thereafter opening the mold with the formed ware adherent to the other of the die members and applying fluid pressure through the conduit and contoured surface of the other die member to release the piece. Our aforementioned prior patents, however, do not specifically describe a method or apparatus for forming holes in shaped ware simultaneously with the production thereof.

It is accordingly a primary object of this invention to provide an improved method and apparatus for forming plastic material, particularly plastic ceramic material, into green ware having a hole in the design thereof.

It is a further primary object of the invention to provide improvements whereby the methods and apparatus of our prior patents, including Patents Nos. 2,584,109 and 2,584,110, may be employed in the production of green ware, including cups with conventional handles attached, having holes in the design thereof.

It is another object of the invention to provide a method and apparatus for forming holes in green ceramic ware while the ware remains supported in the forming mold.

It is an additional object of the invention to provide a method and apparatus for forming undistorted holes in shaped green ceramic ware.

It is a specific object of the invention to provide a mold having punch means which may be employed to form green plastic ware having holes therein.

It is still another object of the invention to provide a means for automatically and simultaneously shaping and forming undistorted holes in plastic material, such as plastic clay.

It is a further object of the invention to provide a mold for simultaneously shaping and forming a hole in plastic ceramic material, such as plastic clay.

It is a particular and specific object of the invention to provide a method and apparatus for producing green cups with conventional handles attached in a unified ware-forming operation.

It is an additional object of the invention to provide an improved mold which may be automatically operated for forming plastic material, including ceramic material, such as moist, plastic clay, into shaped ware, said mold being provided with means for automatically forming a hole in the shaped ware as an adjunct to the shaping step and before the shaped ware is removed from the mold, the ware being supported in the mold while the hole is formed.

It is another object of the invention to provide a method and automatic apparatus for producing shaped ware having a hole in a wall thereof.

It is still another object of the invention to provide a mold, embracing a pair of cooperable die members, the mold being provided with a punch automatically movable across a portion of a ware-shaping cavity defined by the die members when the mold is closed.

The invention will be best understood by reference to the drawings in which:

Figure 1 is a vertical section of a mold embracing one embodiment of the present invention;

Figure 2 is a vertical section, partially schematic, of one form of an automatically operated mold for shaping and forming holes in plastic materials;

Figure 3 is a horizontal section, partially broken away, taken along the line 3—3 of Figure 2;

Figure 4 is a vertical section, partially broken away, taken along the line 4—4 of Figure 3.

Figure 5:
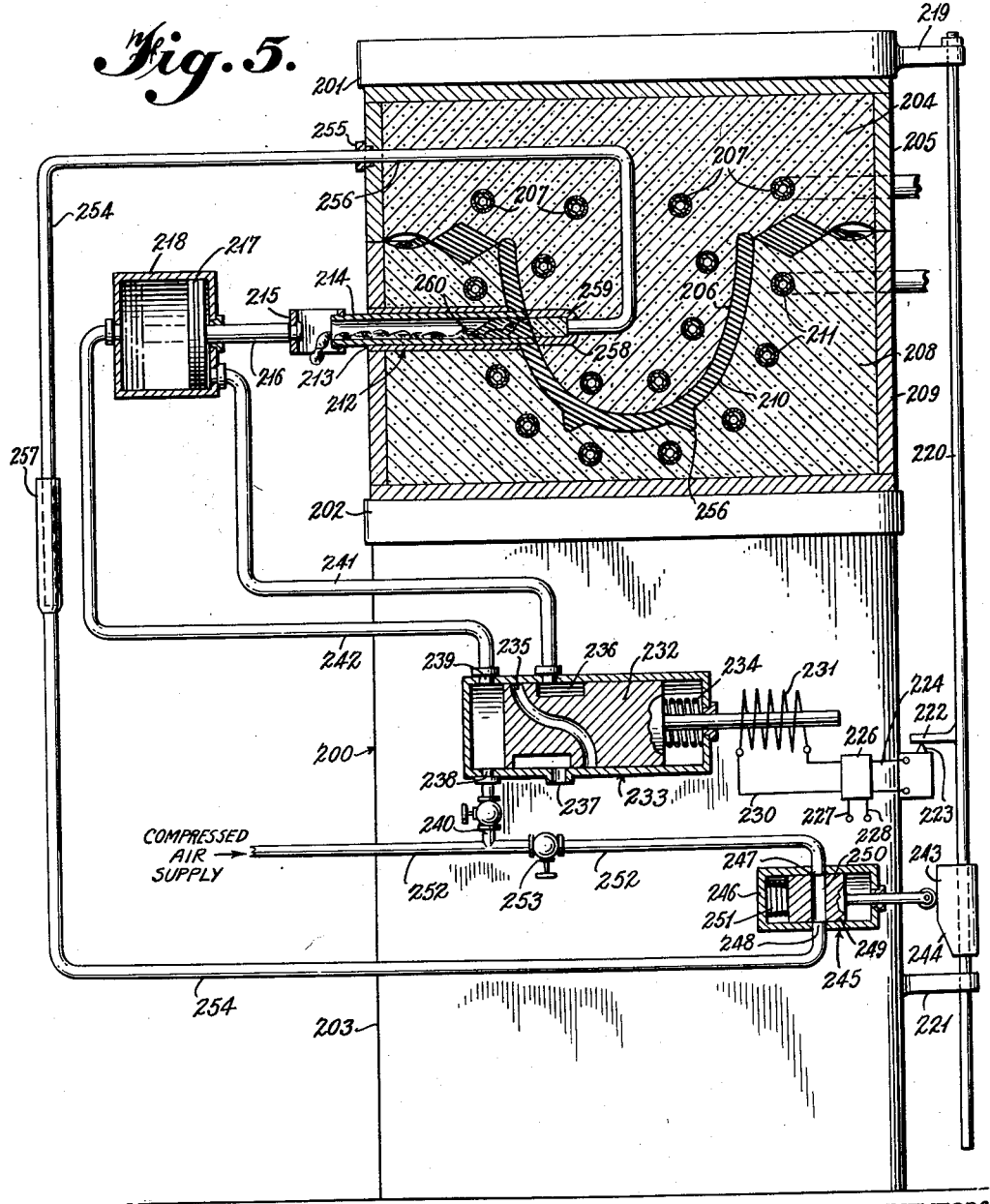
Figure 5 is a vertical section, partially schematic, of another form of automatically operated mold for shaping and forming holes in plastic material.

The embodiment of the invention shown in Figure 1 embraces a mold provided with two opposed, permeable, cooperable die members 10 and 11. The die member 10 embodies a mold ring 12, made of iron or other suitable metal, containing a permeable die body 13 which is preferably fabricated from gypsum cement or plaster, treated in accordance with the method of Patent No. 2,632,209 for imparting improved permeability thereto. The die body 13 of the die member 10 is provided with a ware-forming surface 14 and a fluid pressure conduit 15 for attachment to a source of fluid under pressure, such as water or compressed air, not shown. It is preferred that the pressure conduit 15 be positioned in spaced relationship with respect to the ware-forming surface 14 of the die member 10 to the end that an evenly dispersed blanket of fluid pressure may be forced therefrom outwardly through the die body 13 and the ware-forming surface 14.

The die member 10 carries elongated fluid permeable punch means 16 and 17, which are connected to the conduit 15 for the application of fluid pressure therethrough. Each of the punch means 16 and 17 takes the form of an outer metal tube 18 which is provided with a permeable core 19 which may be fabricated of gypsum cement, porous metal, or other suitable fluid permeable material. Alternatively, the tube 18 may be omitted and punch means 16 and 17 formed entirely of porous material, such as porous metal. Punch means formed entirely of gypsum cement are fragile, chip and break readily, and are otherwise easily damaged, and hence impractical. Punch means in the form of a metal tube having no permeable core and which are not provided with equivalent means, such as shown in Figure 5, for supplying fluid under pressure at the end of the punch, are undesirable. Such punch means adhere to the plastic material from which the ware is shaped to an extent such that the ware may become excessively distorted in the punching operation.

The die member 11 includes a mold ring 20, similar to the mold ring 12, and a porous mold body 21, which may be similar in composition to the porous mold body 13. The mold body 21 is provided with a ware-forming surface 22 which cooperates with the ware-forming surface 14 of the die member 10 to form a ware-forming cavity 23 when the die members are in closed position, as shown in Figure 1. The die member 11 is also provided with a fluid pressure conduit means 24, of the same type as conduit means 15, which is embedded in the die member 10, and connected to a source of fluid pressure, not shown.

A conduit 25 is formed in the die member 11, at a position opposite the punch 16 carried by the die member 10, for receiving and carrying out of the mold plastic material, such as moist clay, which is removed by the punch 16 in the ware-shaping operation when the mold is in use.

The punch 16 carried by the die member 10 extends completely across the ware-forming cavity 23 and is effective to form a hole extending completely through the shaped ware, indicated at 26, when the mold is closed. The punch 17 extends only partially through the shaped ware 26 when the mold is closed and forms a blind hole in the shaped ware.

Each of the die members 10 and 11 are appropriately provided with a plurality of gutters 27 for receiving flash as the ware is shaped when the die members are moved to closed position. Reference is made to our prior Patent No. 2,627,641 for a detailed description of such multiple gutters.

Each of the die members 10 and 11 is provided with an outer face 28 to which is attached a connecting rod 29 which can be suitably secured to a hydraulic press or similar means, not shown, for movement of the die members towards each other for forming plastic material, such as clay, and subsequent separation of the die members after the clay is shaped.

In operation, the mold as shown in Figure 1 is first placed in open position with the die members 10 and 11 separated. A charge of moist, plastic clay is placed on the lower die member 11 and the die members 10 and 11 are then moved to closed position to squeeze the clay charge between the die members, shape the charge, and expel moisture therefrom into the die members. Thereafter, air is applied through the conduit 24 of the die member 11 thereby expelling air and moisture through the mold body 21 to the contoured ware-forming surface 22 and releasing the shaped ware 26 therefrom.

The die members 10 aand 11 are then moved to open position and air pressure is applied through the conduit 15 whereby air and moisture are blown back to the contoured surface of the die member 10 and the shaped ware 26 is released therefrom. Simultaneously, air passes through the punch members 16 and 17 which have absorbed water from the moist, plastic clay in the ware-forming operation. In this manner, the absorbed water is at least in part expelled from the punch members 16 and 17 and operates, in conjunction with the air pressure, to release the punch members from the shaped ware without distortion thereof.

The invention which is disclosed in Steele and Bryer Patent No. 2,632,227 for effecting differential release of ceramic ware from porous molds may be appropriately practiced in the operation of the mold of this invention.

The automatic apparatus shown in Figures 2, 3 and 4 embraces a conventional hydraulic press, shown generally at 50, having a movable upper member 51 and a stationary lower member 52. The hydraulic press, per se, is of conventional commercial design, hence the details of the construction and operation of the press are not shown.

The upper movable press member 51 carries a porous, preferably plaster, male die member 53 enclosed in a mold ring 54 and provided with a contoured ware-forming surface 55 (see Fig. 4) and a fluid pressure conduit means 56 for connection to a source of fluid pressure, not shown.

The lower stationary press member 52 carries a porous, preferably plaster, female die member 57 enclosed in a mold ring 58 and provided with a contoured ware-forming surface 60 (see Figs. 3 and 4), and a fluid pressure conduit means 61 for connection to a source of fluid pressure, not shown. The composition and general structure of the die members 53 and 57 is analogous to that of the die members 13 and 21 of Fig. 1.

The female die member 57 is additionally provided with a horizontal conduit 62 extending completely thereacross and terminating in suitable holes 63 on opposite sides of the mold ring 58. The conduit 62 passes across a portion 64 of the ware forming surface of the female die member. In the embodiment shown in the drawings, the conduit 62 passes through that ware-forming area of the female die adapted to form a handle appendage 65 on a cup 66. The conduit 62 carries a pair of metal sleeves 67 and 68 extending respectively from the mold ring 58 to the opposite sides of the handle appendage forming area of the ware-forming surface 60 of the female die 57. If desired, the sleeves 67 and 68 may be extended a short distance beyond the mold ring, as shown, for example, in Fig. 1 with respect to the sleeve 25.

A hole-forming punch means 69 is slidably mounted in the sleeve 67. The punch 69 takes the form of a hollow, preferably metal, tube 70 having a porous metal or plaster core 71 in the punching end thereof. The opposite end of the punch 69 is connected at 73 to the hollow piston rod 74 of the piston 75 of the small air cylinder, shown generally at 76. A small hole is provided in the face of piston 75 to admit air to the hollow piston rod 74. Appropriate means, such as a shelf, not shown, may be provided for supporting the air cylinder 76.

The upper press member 51 is provided with a horizontally extending arm 77 carrying the vertically positioned rod 78 which slidably engages the horizontal arm 79 extending from the base 80 of the base 50. The rod 78 is provided with a horizontal contact member 81 for engaging and closing the microswitch 82 when the die members 53 and 57 are closed, as shown in the drawing. Lines 83 and 84 connect the microswitch 82 to the timer 85, which in turn is connected through lines 86 and 87 to the solenoid 88. The timer 85 is connected to a source of current, not shown, by lines 89 and 90 and controls the flow of current from such source necessary to actuate solenoid 88. Normally, timer 85 is set to maintain flow of current to actuate the solenoid 88 for about 0.1 to about 5 seconds.

The solenoid 88 is operatively connected to the piston 91 of the valve 92. The piston 91 assumes the position shown in the drawing only when the solenoid 88 is actuated as a result of the closing of the microswitch 82. At other times, the piston 91 is urged against the opposite end of the valve 92 by the spring 93.

The valve 92 is provided with passages 94 and 95 and ports 96, 97 and 98. Leading into the valve 92 is a conduit 99 leading to a source of compressed air, not shown. The valve 92 is connected to the air cylinder 76 by conduits 100 and 101.

In operation, the press is actuated to separate the die members 53 and 57 and a batt or mass of plaster material, such as plastic ceramic material, e. g., clay, is dropped or placed on the female die member 57. The press is then actuated to close the die members 53 and 57 and shape the ware, which in the embodiment shown in the drawings is a cup.

Throughout this sequence of steps, and until the die members are sufficiently closed for the contact 81 to close the microswitch 82, the punch 69 will remain retracted, the piston 78 assuming the position shown in broken line in the drawing under pressure of air flowing through the conduit 92, passage 89 of valve 87, and conduit 95. Hence, during the ware-forming step, the punch is withdrawn from the ware-forming cavity and the handle appendage can be properly shaped.

Upon contact of the member 81, which moves downwardly as the die closes, with microswitch 82, timer 85 operates to permit actuation of solenoid 88 by current flowing through lines 89, 90, 86, and 87. The timer 85 is set to maintain such current flow for only a short time, normally about 0.5 to 5 seconds. Solenoid 88 when energized moves the piston 91 of the valve 92 to the position shown in the drawing, whereupon compressed air flows through the conduit 99, ports 97 and 98 of valve 92, and conduit 101, into the cylinder 76, forcing the piston 75 to the position shown in the drawing and thereby causing the punch 69 to pass through the handle 65 of the cup 66. Air evacuated from the cylinder 76 exits through conduit 100 into passage 94 and out through vent 96 of valve 92. Air under pressure also flows through the hollow piston rod 74 into the tube 69 of punch 70 and through the porous core 72 serving to prevent adherence of the punch end to the punched out scrap material 102.

When timer 85 operates to terminate flow of current to solenoid 88, the solenoid is deactuated and piston 91 of valve 92, under the urging of spring 93, moves to the end of the valve 92 opposite that which it occupies in the drawing. As a result, compressed air flows through conduit 99, passage 94 of valve 92, conduit 100 and into cylinder 76, forcing piston 75 to the position shown in broken line in the drawing, thereby retracting punch 69. Air from the cylinder 76 exists through conduit 101 and port 98, passage 95, and port 96 of valve 92.

The ware is thereafter separated from the die members on opening the press, in the same manner as described with respect to Figure 1. Plastic material 102 removed by the punch 69 exits through the sleeve 68.

The apparatus shown in Figure 5 corresponds in many respects to that of Figure 4. The apparatus of Figure 5, however, is designed to permit use of a hollow metal punch without a porous core, the material removed by the punch exiting through the body of the punch, means being provided for effecting release of the punch from the green ware without distortion thereof. As is true in the other embodiments of the invention, holes are formed in green ceramic or other plaster ware while the ware is supported in the mold in which it is formed.

In Figure 5 there is shown a conventional hydraulic press 200 having a movable upper member 201, a stationary lower member 202, and a base 203.

The upper press member carries a porous, preferably plaster, male die 204 enclosed in a mold ring 205 and provided with a contoured ware-forming surface 206 and fluid pressure conduit means 207 for connection to a source of fluid pressure, not shown.

The lower press member 202 carries a porous, preferably plaster, female die 208 surrounded by mold ring 209 and provided with a ware-forming surface 210 and fluid pressure conduit means 211 for connection to a source of fluid pressure, not shown.

The female die is provided with a conduit 212 extending from an appropriate aperture in the mold ring 209 to the ware-forming surface 210 and lined with a metal sleeve 213. Slidably mounted in sleeve 213 is a punch 214 which takes the form of a hollow metal cylinder. The outer end of the punch 214 is connected through rigid open link 215 to the piston rod 216 of the piston 217 of the small air cylinder 218.

The upper press member 101 is equipped with a horizontally extending arm 219 carrying the vertically disposed rod 220 which slidably engages the arm 221 extending from the press base 203. The rod 220 is provided with contact member 222 for engaging and closing microswitch 223 when the die members are closed, as shown in the drawing. Lines 224 and 225 connect microswitch 223 with timer 226, which is provided with lines 227 and 228 for connection to a source of electric power, not shown, and which is connected by lines 229 and 230 to solenoid 231. Upon closing of microswitch 223, timer 226 operates to permit flow of actuating current to solenoid 226 for a short time period.

The solenoid 231 is operatively connected to the piston 232 of valve 233. Under pressure of spring 234, the piston is urged to the end valve 233 opposite that which it is shown as occupying in the drawing when solenoid 231 is not actuated through timer 226 by the closing of the die members. The piston 232 is provided with passages 235 and 236 and ports 237, 238, and 239. Pressure regulatable conduit 240 is provided for introducing compressed air, from a source not shown, into valve 233. Conduits 241 and 242 connect valve 233 with air cylinder 218.

The rod 220 is further provided with sleeve 243 which is tapered at 244 which actuates roller-operated spring return two-way valve 245. The valve 245 includes a cylinder 246 provided with ports 247 and 248. A piston 249 with a passage 250 therein is slidably mounted in the cylinder 246. The piston 249 is normally urged by spring 251 to a position to close the valve by blocking the ports. The valve 245 is connected by line 252 to a source of compressed air, not shown. Line 252 is provided with suitable valve means 253 for controlling the pressure therein. Valve 245 is also connected to conduit 254 which is in turn connected at 255 to the conduit 256 in the upper male die 205. The conduit 254 is provided with an extensible or slidable joint at 257 to permit raising and lowering of the male die. Alternatively, the conduit 254 may be of flexible material of sufficient length to permit necessary movement of the male die. As shown in the drawing, the valve 245 is open, such that compressed air can pass through the conduit 254. When the die members 204 and 208 are open, the valve 245 is automatically closed by the spring actuating means carried thereby.

The conduit 256 in the upper die member 204 terminates in a porous insert 258 enclosed in a metal thimble 259 so positioned as to be directly opposite the punch 214 carried by the female die member 208 when the dies are closed. It will be noted that the edges of the metal walls of thimble 258 engage the end of the punch 214, thereby preventing damage to the male die member 204.

In operation, the die members 204 and 208 are opened and a batt or mass of moldable plastic material, such as plastic ceramic clay or moldable synthetic resinous material, is dropped or placed on the female die member 208. The press is then actuated to close the die members 204 and 208 and shape the ware.

Downward movement of the upper press member 201 effects simultaneous downward movement of the rod 220 including the contact member 222 and the sleeve 238 carried thereby. During this downward movement, the punch 214 remains retracted, and no compressed air flows through conduits 254 and 256. The piston 217 remains in the position shown in broken line in the drawing under pressure of air flowing through conduits 252 and 240, passage 238 of valve 233, and line 241 to the cylinder 218.

When the die members 204 and 208 are closed by downward movement of the upper press member 201, microswitch 223 is closed by contact arm 222, timer 226 operates to permit actuating current to flow through lines 227, 228, 229 and 230 to solenoid 231. Actuation of solenoid 231 causes the piston 232 of valve 233 to assume the position shown in the drawing. As a result, piston 217 is forced into the position shown in the drawing by pressure of air flowing through conduits 252 and 240, the ports 238 and 239 of valve 233, and conduit 242. Punch 214 is urged by movement of the piston 217 through the shaped ware 256 which has been formed by the closing of the die members 204 and 208. Air from the cylinder 218, which must be displaced to permit the described movement of the piston, exits through conduit 241 and passage 236, and vent 237 of valve 233.

Simultaneously with the actuation of the punch 214, the sleeve 243 opens the valve 245, as shown in the drawing, permitting compressed air to flow through conduits 254 and 256 and thence into porous insert 258. This compressed air precludes undue adherence of the punched out plastic material 260 to the male die and prevents distortion of the shaped ware as the punch is retracted. The material removed by the punch exits backwardly therethrough and passes out of the punch at the open connecting link 215.

When the timer 226 terminates the flow of actuating current thereto, normally after a period of about 0.5 to about 10 seconds, solenoid 231 is deactuated, the piston 232 of valve 233 assumes a position at the end of the valve 233 opposite that shown in the drawing. Compressed air flows through conduits 252 and 240, port 238 and passage 236 of valve 233, and conduit 241, into cylinder 218, forcing piston 217 to the position shown in broken line in the drawing, and withdrawing punch 214 from the ware. Air exits from the cylinder 218 through conduit 242 and port 239, passage 235 and port 237 of valve 233.

The members 204 and 208 are opened after the punch 214 is retracted. Upward movement of the sleeve 243 beyond valve 245 terminates the flow of compressed air in conduits 254 and 256 by closing the valve 245.

The shaped ware is separated from the die members in the same manner as described with respect to Figure 1.

Specifically, in the preferred procedure, compressed air is introduced into the conduit 211 of the lower female die member 208 and outwardly through the contoured surface 210 thereof to release the ware therefrom. Thereafter the die members 204 and 208 are opened with the shaped ware adherent to the upper male die member 204. After the die members have been opened, the die member 204 is pressurized by the introduction of compressed air into the conduit 207 to separate the shaped ware therefrom.

While this invention has been described with particular emphasis on the shaping and production of green ceramic ware, the method and apparatus disclosed are equally applicable to the production of shaped objects from moldable materials of all types, including particularly synthetic resinous materials which may be either moldable cold or which may be thermoplastic and heat softened prior to the molding operation.

Typical thermoplastic resinous materials which can be molded in a heat softened state include polyethylene, polystyrene, polyvinyl acetate, polyvinyl chloride, the vinyl resins generically, and the like. The specific moldable compositions are well known to the art.

We claim:

1. A mold for forming plastic material into shaped ware comprising cooperable, permeable die members movable from an open position to a closed position, said die members having opposed contoured surfaces defining a ware-shaping cavity when the mold is closed, means for applying fluid pressure through the contoured surfaces of at least one of said die members, elongated fluid permeable punch means carried by one of said die members for displacing plastic material to form a hole in ware shaped in said cavity while said ware is supported in said mold, and means for forcing a fluid under pressure from the interior of said punch means outwardly therethrough to facilitate removal of said punch from the shaped ware without distorting the hole.

2. A mold as recited in claim 1 wherein the punch means comprises a tube having a permeable core and is movable across a portion of the ware-forming cavity.

3. A mold as recited in claim 2 wherein the punch is connected to the fluid pressure applying means of the die by which it is carried.

4. A mold as recited in claim 1 wherein the elongated punch means extends only partially through the ware-shaping cavity formed when the die members are closed to form a blind hole in the ware as the ware is shaped.

5. A mold for forming shaped articles from plastic material comprising a pair of cooperable, fluid permeable die members having opposed, contoured surfaces defining an article-shaping cavity when the mold is closed, means for applying fluid pressure through the contoured surfaces of the die members, fluid permeable punch means carried by a first of said die members for movement across at least a portion of said article shaping cavity when the mold is closed, means for forcing a fluid under pressure from the interior of said punch means outwardly therethrough, means for opening and closing said die members, and means for automatically moving said punch means across at least a portion of said article forming cavity and thereafter retracting said punch therefrom.

6. An automatic mold for forming plastic material into shaped ware having holes in the design thereof which comprises a pair of cooperable, permeable die members, said die members having opposed, contoured surfaces defining a ware-shaping cavity when the mold is closed, means for applying fluid under pressure through the contoured surfaces of said die members, automatic means for opening and closing said die members, punch means carried by a first of said die members, means synchronized with said automatic means for moving said punch means across a portion of said ware-shaping cavity when the mold is closed and means for supplying fluid pressure at the end of said punch means upon completion of the movement of said punch means across said cavity.

7. An automatic mold, as defined in claim 6, wherein the second of said die members is provided with a conduit for receiving plastic material displaced by said punch and wherein said punch is fluid permeable.

8. An automatic mold for forming plastic ceramic material into cups having handles of conventional design comprising cooperable, permeable die members having opposed, contoured surfaces defining the shape of a cup having a solid handle appendage when the mold is closed, means for opening and closing said mold, porous punch means carried by a first of said members for movement through said handle appendage when the die members are closed, means for applying fluid pressure through said punch means to facilitate withdrawal of said punch means from said appendage without distortion thereof, and conduit means carried by one of said die members for receiving the plastic material removed from said appendage by said punch.

9. A method for forming cups with conventional handles attached which comprises placing a mass of plastic ceramic material on a first of a pair of cooperable, permeable die members having opposed, contoured ware-forming surfaces defining a ware-forming cavity in the shape of a cup having a handle appendage attached when the die members are closed, closing said die members to form said mass into the shape of a cup having a handle appendage, moving a porous, fluid permeable punch through said appendage while said cup and appendage remain supported in said mold, forcing fluid under pressure from the interior of said punch outwardly therethrough to facilitate removal of said punch without distorting the hole formed in the ware by said punch, withdrawing said punch from said appendage while maintaining at least atmospheric pressure in the hole at the end of said punch, and separating said cup, with handle attached, from said die members.

10. A mold for forming shaped articles from plastic material comprising a pair of cooperable fluid permeable die members having opposed contoured surfaces defining an article shaping cavity when the mold is closed, means for applying fluid pressure through the contoured surfaces of the die members, punch means comprising a hollow tube carried by a first of said die members for movement across at least a portion of said article shaping cavity when the mold is closed, said punch means being of sufficient length to extend completely across the ware shaping cavity when the mold is closed to punch a hole completely through ware shaped in said cavity, means for opening and closing said die members, means for automatically moving said punch means across at least a portion of said article forming cavity and thereafter retracting said punch means therefrom, said second die member including means providing a porous fluid permeable surface facing the end of said punch means, a fluid pressure conduit in said second die member to supply concentrated fluid pressure outwardly through said fluid permeable surface when the dies are closed to prevent distortion of the hole by the removal of said punch means from the shaped ware.

11. A mold for forming plastic material into shaped ware comprising cooperable, permeable die members movable from an open position to a closed position, said die members having opposed contoured surfaces defining a ware-shaping cavity when the mold is closed, means for applying fluid pressure through the contoured surfaces of at least one of said die members, elongated punch means carried by one of said die members for displacing plastic material to form a hole in ware shaped in said cavity while said ware is supported in said mold, means providing a porous fluid permeable surface adjacent the end of the punch means when said punch means is at the end of the path of punching movement and means for introducing fluid under pressure through said surface to facilitate removal of said punch means from the shaped ware without distorting the hole.

12. A mold for forming plastic material into shaped ware comprising a pair of cooperable, fluid permeable die members movable from an open position to a closed position, said die members having opposed contoured surfaces defining a ware shaping cavity when the mold is closed, means for applying fluid pressure through at least one of said contoured surfaces, elongated punch means carried by one of said die members, said punch means being of sufficient length to extend completely across the ware shaping cavity when the mold is closed to punch a hole completely through ware shaped in said cavity, conduit means connecting the exterior of said mold with the end of said punch means when said punch means extends completely across said cavity for receiving plastic material removed from the ware by the punch means, and means providing a porous fluid permeable surface facing said conduit means for forcing plastic material removed by said punch means into said conduit, and means for introducing fluid under pressure through said porous surface to prevent distortion of the hole by the removal of said punch means from the shaped ware.

13. A mold as recited in claim 12 wherein said conduit means is positioned in the other of said die members and said porous surface providing means is a part of said punch means.

14. A mold as recited in claim 12 wherein said conduit means is a part of said punch means and said porous surface providing means is positioned in the other of said die members.

15. A mold as recited in claim 14 wherein said porous surface providing means is a porous insert positioned in a fluid impervious retaining means.

16. A method for forming, from plastic material, shaped articles having holes in the design thereof which comprises placing a mass of plastic material on a first of a pair of cooperable, fluid permeable die members, bringing said die members into registry to shape the article, passing a punch into the article while the article is supported by at least one of the die members, forcing fluid under pressure through a fluid permeable surface adjacent the end of said punch to facilitate removal of said punch without distorting the hole, withdrawing said punch from the article while maintaining at least atmospheric pressure in the hole at the end of said punch, and removing the shaped article from the die members.

References Cited in the file of this patent

UNITED STATES PATENTS

| 1,740,757 | Westerfield | Dec. 24, 1929 |
| 2,169,891 | Beal et al. | Aug. 15, 1939 |
| 2,177,461 | Ruthven | Oct. 24, 1939 |
| 2,360,337 | Gookin | Oct. 17, 1944 |
| 2,627,641 | Steele et al. | Feb. 10, 1953 |

FOREIGN PATENTS

| 198,275 | Germany | May 11, 1908 |
| 569,118 | Germany | Jan. 28, 1933 |